United States Patent [19]

Nowicki et al.

[11] Patent Number: 4,472,198

[45] Date of Patent: Sep. 18, 1984

[54] PROCESS AND SYSTEM OF WASTING FLY ASH AND PRODUCT PRODUCED THEREBY

[75] Inventors: Mitchell L. Nowicki, Washington; Alan R. Dunbar, Romeoville; Joseph H. Pound, Mt. Prospect, all of Ill.

[73] Assignee: American Fly Ash Company, Des Plaines, Ill.

[21] Appl. No.: 344,152

[22] Filed: Jan. 29, 1982

[51] Int. Cl.³ ............................................. C04B 7/12
[52] U.S. Cl. ................................ 106/85; 106/DIG. 1
[58] Field of Search ......................... 106/85, DIG. 1

[56] References Cited

U.S. PATENT DOCUMENTS 4,226,630  10/1980  Styron ........................... 106/DIG. 1
4,313,762   2/1982  Pound ................................... 106/85
4,354,876  10/1982  Webster ................................ 106/85

*Primary Examiner*—James Poer

[57] ABSTRACT

A method and system for disposing of fly ash together with water or liquid industrial waste, and the product produced thereby, in an environmentally acceptable manner which includes combining dry fly ash with a liquid additive in an amount of about 5%–25% of weight of liquid additive to weight of fly ash in a mixing operation which closely controls the liquid additive to yield a uniformly conditioned product which can be subjected to earth handling equipment pressures immediately and which eliminates cell preparation and greatly reduces leaching at the disposal site.

5 Claims, 19 Drawing Figures

'A' FLY ASH - WATER

'A' FLY ASH - WATER

'A' FLY ASH - WATER

'A' FLY ASH
LIQUID WASTE

'A' FLY ASH
LIQUID WASTE

'A' FLY ASH
LIQUID WASTE

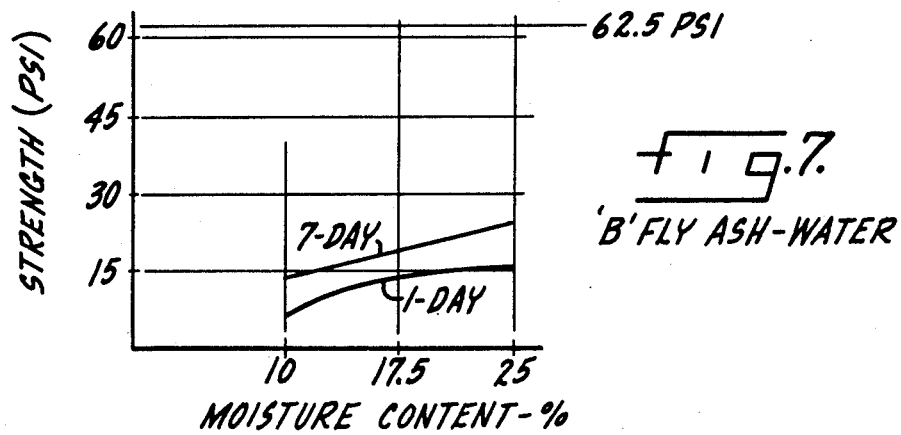
Fig. 7. 'B' FLY ASH-WATER
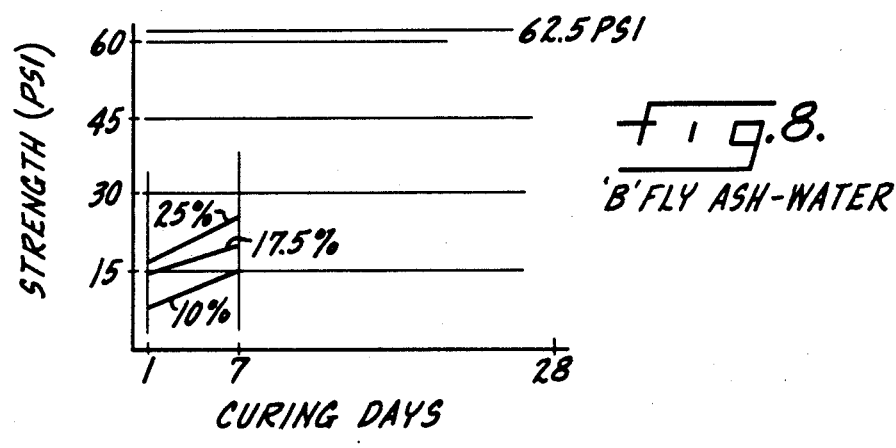
Fig. 8. 'B' FLY ASH-WATER
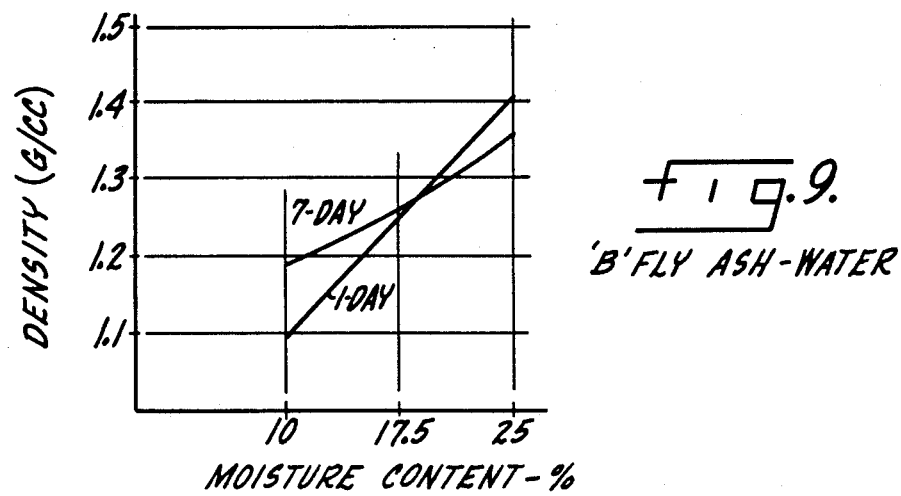
Fig. 9. 'B' FLY ASH-WATER

'B' FLY ASH
LIQUID WASTE

'B' FLY ASH
LIQUID WASTE

'B' FLY ASH
LIQUID WASTE

'C' FLY ASH - WATER

'C' FLY ASH - WATER

'C' FLY ASH - WATER

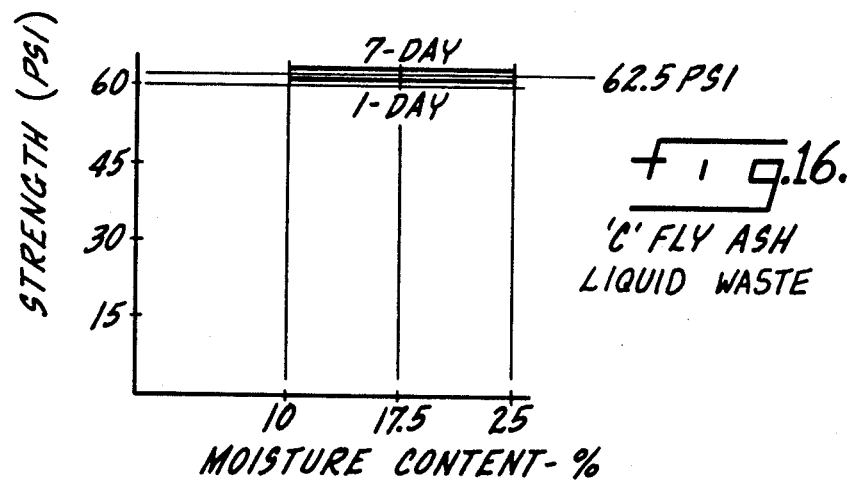
Fig. 16. 'C' FLY ASH LIQUID WASTE
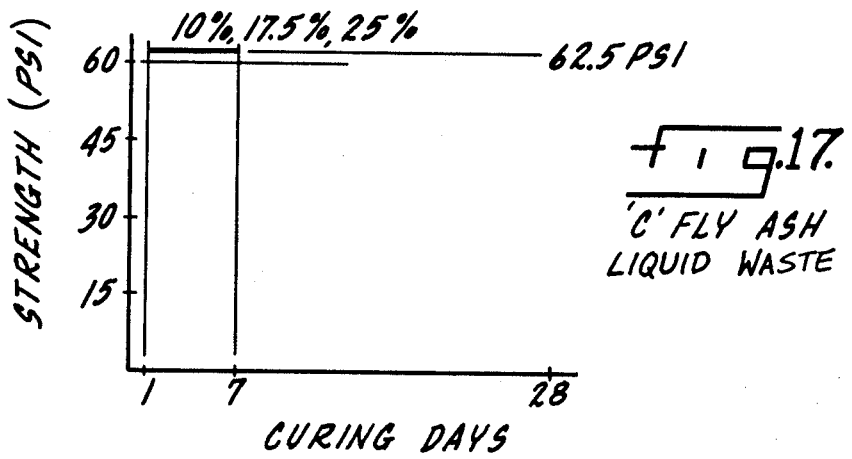
Fig. 17. 'C' FLY ASH LIQUID WASTE
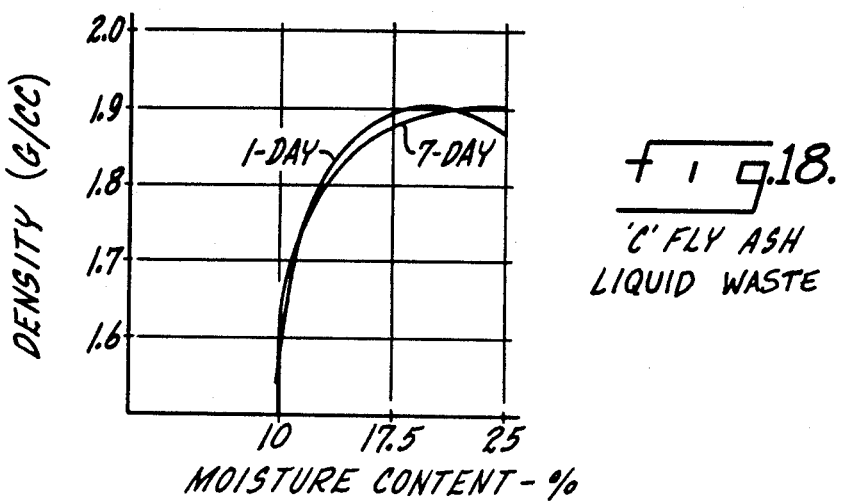
Fig. 18. 'C' FLY ASH LIQUID WASTE

PROCESS AND SYSTEM OF WASTING FLY ASH AND PRODUCT PRODUCED THEREBY

This invention relates generally to a process and system for wasting fly ash, and is specifically directed to a fly ash wasting system which provides an economical and environmentally acceptable mode of wasting fly ash which has been generated in large quantities per unit of time, as in the case of coal-burning electric power generating stations.

The invention further relates to a process and system for wasting fly ash in combination with various liquid wastes and is specifically directed to a wasting system which provides an economical and environmentally acceptable mode of wasting fly ash which has been generated in large quantities per unit of time in combination with water or liquid waste products which have been produced as a by-product of industrial processes. In either process or system briefly described above, the fly ash and the liquid component are combined in such a manner as to produce a soil-like product, which can be emplaced using conventional earth-handling methods, and which has initial structural stability.

BACKGROUND OF THE INVENTION

Disposition of fly ash, which is essentially fine solid non-combustible mineral residues (not to be equated with bottom ash, cinders, or slag) from coal-burning installations such as electric power generating stations is an increasingly difficult problem. Recent and increasingly strict environmental restrictions pertaining to the handling and final placement of fly ash, and the currently available technology (which was developed without prime importance being attributed to environmental considerations or changing ash characteristics) have combined to make the wasting of fly ash a source of rapidly escalating costs and environmental concerns common to nearly all coal burning plants.

The disposition of liquid wastes which are generated as by-products of various industrial processes also poses a difficult problem. These wastes, categorized as either hazardous or non-hazardous by various regulatory agencies, pose an unusual disposal problem in their natural state, and an increasing amount of emphasis is being placed on solidifying these liquid wastes in the disposal process. The technology by which this is accomplished is developing; however, all processes developed to date significantly increase the cost of disposal of these materials.

One of the greatest sources of fly ash, and a source which invariably impinges heavily on populated areas, are electric power generating stations. Accordingly, the invention of this application will be described in terms of the handling (in a transporting sense) and the treatment of fly ash which is generated at a power station. It should be understood however that the inventive concepts described herein are applicable to any source of fly ash generation.

Water for the treatment of fly ash can be obtained from ground or surface water sources dependent on availbility.

Liquid wastes employed in the disclosed process are produced as a by-product of industrial processes, which liquid waste materials must themselves be disposed of in accordance with environmental requirements.

The liquid waste used in the embodiments disclosed in this application was from the equipment manufacturing industry. This disclosure will pertain to transporting and treatment of liquid wastes, or water from a selected source, along with fly ash to form an acceptable landfill mixture. However the inventive concepts described herein are applicable to any source of liquid waste and water.

The methods of wasting fly ash which traditionally have been utilized in connection with electric power plant operations are the "sluicing" method and the "dampening" method.

The sluicing method, of wasting fly ash requires a liquid content of greater than 90%. Liquid content is defined as the ratio of the weight of the liquid divided by the weight of the dry fly ash expressed as a percent. In the water sluicing process a small amount of fly ash is mixed with a large amount of liquid and pumped into a holding pond or cell. As a consequence this process has several disadvantages when considered in relation to current commercial and environmental conditions. On many occasions such quantities of liquid are not readily available, or, are only available at a very high cost, such as in arid regions. A liquid, such as water, is becoming an increasingly valuable natural resource which must be protected. Further, expensive site preparation such as special cell liners and embankments for liquid decanting and liquid recycling facilities must be employed.

In the dampening method of wasting fly ash, just sufficient liquid is added to the dry fly ash to calm the dust. Although the liquid content will vary with the type of fly ash (which of course varies with the types of coal burned in the boiler, and its condition—i.e., crushed or pulverized) a liquid content of about 5% is the minimum lower limit while about 25% is the maximum upper limit of liquid in this process.

Current dampening systems commonly mix a continuous flow of fly ash with a continuous flow of liquid. Although the liquid addition rate can be controlled, the fly ash will not flow on a uniform basis and, as a result, the liquid content of the dampened fly ash will vary from practically nothing to 50% or more. This variability produces handling problems in that at the lower end of the liquid range fugitive dust is generated; on the upper end, the ash is turned into a paste or sludge which will not empty from a conventional dump truck. Further, the variability of liquid contents typically causes difficulty with landfill compaction. This impacts negatively on the environmental acceptability of the disposal operation.

The existing dampening systems are becoming less and less suitable for today's needs since fugitive dust is always a problem and handling problems are invariably encountered particularly with changing fly ash chemical characteristics.

Liquid control can be critical for certain types of fly ash. Fly ash materials are classified by ASTM as type "C" or type "F". A type "C" fly ash has a relatively high calcium content and reduced iron content (as compared to a type "F" fly ash) and in many instances behaves as a natural cement when mixed with certain quantities of liquid.

Attempts have been made in the past to utilize dampending systems with Class C fly ashes. However, because of the chemically reactive nature of Class C fly ash and the lack of liquid content control in mixing, many operational and environmental problems have been encountered. In this connection it should be noted that, in the past, the liquid content control needed to adequately process Class C fly ashes is much more important than with Class F fly ashes. Also, environmental rules require greater control for disposing of all types of fly ashes to control fugitive dusts, and produce a sound structural landfill. In the existing systems of dampening fly ash, the flow of fly ash from dry storage is typically non-uniform, not continuous, because of inherent fly ash handling problems, while the flow of liquid is typically uniform. For example, the fly ash and liquid may be mixed in an inclined rotary drum mixer or vertical conical mixer, each of which turns continuously while the materials are being combined. The mixing time within this type of mixer is typically under 10 seconds, which results in a non-uniform end product due to inadequate mixing. Another type of mixing involves filling a turbine mixer from a rotary vane feeder, which in turn is fed from a fly ash storage silo.

The rotary vane feeder is allowed to turn for a given length of time, then shut off and a predetermined amount of water is added to the fly ash and the combination mixed. However, since fly ash never flows from a silo uniformly over time, the amount of ash in the mixer will be non-uniform, resulting in variable liquid contents; indeed, the liquid content may vary from nearly 0% to 50% or more. When using this system on Class C ashes, many problems arise, some environmental, some operational. When too little liquid (typically under 10% depending on the ash) is added to the fly ash, the mixture will be too dry and dusting problems will be encountered in the loading, transport and landfilling operation of the ash. When too much liquid is added (typically above 25% liquid content) the mixture becomes either very sticky and hardens quickly, thereby plugging mixing equipment or fails to discharge from a conventional dump truck, or the mixture will be too soupy and leak from the dump truck during the trip to the landfill.

While this uncontrolled system generally produces a poor landfill material, equipment maintenance problems are an even greater concern.

As a result, typically, this essentially uncontrolled liquid content mixing has been unacceptable with most Class C fly ashes.

There is typically a liquid content range (10%–15% for Class F, 15% to 25% for Class C, depending on the particular fly ash and liquid used for mixing) where a uniformly dampened fly ash will act like a conditioned fly ash. As a conditioned mixture, dust is not a problem because all the dust is combined with water and wetted in contrast to the dampening process. The conditioned mixture will not be so sticky as to plug the mixing equipment in contrast to the dampening process. It can also be placed into a dump truck and hauled many miles to a landfill and not stick or harden in the bed of the truck at the landfill.

In effect, it is essential to control both the fly ash and liquid going into a mixture to assure the resulting mixture will have a liquid content that will not cause dusting problems from too little water, or sticking, plugging, or leaking problems from too much water.

The wasting of liquid wastes historically has been accomplished using very crude methods. Typically these liquids are transported to a disposal site in sealed tank trucks. These trucks are routed in conventional landfill operations to the point of general refuse disposal. The liquid wastes are dumped into the refuse, such as garbage, and mixed with a compacting bulldozer. The theory is that the refuse will soak up the liquid wastes, thereby reducing the impact on landfill conditions. The amount of liquid waste which can be mixed with garbage is controlled by regulatory agencies. Nevertheless, landfills have commonly become saturated with liquid waste, thereby generating environmental hazards and concerns.

Accordingly it is the primary object of this invention to provide a process and system for wasting fly ash and liquid wastes and/or water, which is economical, environmentally acceptable, and minimizes the major disadvantages of all currently known systems, including the sluicing, slurry and dampening processes described above.

A specific object of the invention is to provide a method of and system for wasting fly ash whereby fly ash is transported from a source, such as a power station's storage silo, to the disposal site in a manner which eliminates virtually all fugitive dust.

A further object is to provide a method of wasting fly ash in which the final mixture will have a liquid content of about 5% to 25%, and in which the liquid content and the density of the mass will be uniform, controllable and with maximum density.

Another object of the invention is to provide a process of wasting fly ash and a system therefore which results in no bleed water being generated at any point in the process.

Yet another object is to provide a fly ash wasting system which lends itself to control of sulfur efflorescence which is particularly advantageous in connection with handling fly ash.

Yet another object is to provide a process and system of wasting fly ash in which the processed fly ash can be transported many miles, placed, and compacted into a hard and stable mass which will support significant structural loads of up to several tons per square foot.

Yet another object is to provide a fly ash wasting system which requires only conventional, mechanical earth-moving means to emplace a mixed product having a damp-earth consistency, which product may therefore immediately be mechanically spread or compacted.

Yet another object is to provide a fly ash wasting system in which the final, hardened product meets all current environmental requirements, and is resistent to percolation from rainfall thereby reducing the pollution potential in the disposal area.

Another object is to provide a controlled system of mixing uniformly the fly ash and liquid so that the liquid content of the mixture is controlled to within 1% of the designed optimum.

Another object is to provide an environmentally sound method of disposing of liquid wastes by mixing said liquid wastes with fly ash to produce an end product and landfill mixture which is structurally stable, environmentally sound and yet economical to produce.

Another object is to recycle surface water runoff from within the landfill site in the processing system of fly ash disposal.

Yet another object is to provide a system which can be operated at the fly ash source, liquid waste source, landfill, or other location depending on economical or environmental considerations.

Yet another object is to provide a system which can change rapidly and accurately the liquid content of the conditioned mixture to accommodate chemical/physical changes in the fly ash or liquids.

BRIEF DESCRIPTION OF THE INVENTION

The invention will be described in terms of handling dry (less than one percent water content) fly ash produced as a combustion by-product at a coal fired power generating station. It will be assumed that the fly ash has cooled and has been removed from the boiler in the electric power generating station and transferred by any conventional means to a closed storage silo at the power station preparatory to being wasted. It will also be assumed that the final disposal site and process plant are located a substantial distance from the power station, and the landfill consists of a fill area of conventional size such as, for example, about fifty acres.

However, it must be remembered that the process could be carried out at the electric generating station or any place accessible to heavy truck traffic. It will also be assumed that the liquid waste is taken to the landfill site from any industrial producer of such waste for processing, or water is provided at the landfill site.

The dry fly ash is discharged from an electric power generating station storage silo into a closed chamber transport vehicle such as a pneumatic bulk transport truck. After filling, the truck is sealed to prevent dust leakage during transit to the processing plant which is located near the final disposal site.

At the processing plant the dry fly ash is transferred from the bulk trailer to a storage silo which has a discharge outlet positioned to discharge the dry fly ash into a batching vessel.

The liquid waste is collected at an industrial location and is pumped or placed into a sealed bulk tank truck and transported to the processing plant where it is pumped or otherwise discharged into a holding vessel or pond.

Water may also be available to mix with the fly ash, either from a surface water retention pond and/or water well.

After sufficient fly ash is available in the storage silo and the liquid waste, or water, is collected, the bulk storage silo discharge outlet is opened to feed the dry fly ash into the batch hopper. Once the batch hopper has been filled to a predetermined amount, the flow of ash to the hopper is stopped. The batch hopper is then discharged into a turbine mixer, where it is mixed with sufficient water or liquid waste to yield a final liquid content of from about 5% to 25% or, more preferably, from about 10% to 20%, or the equivalent thereof, depending to some extent on the type and condition of the fly ash and liquid. The storage silo may be pressurized to facilitate discharge of the dry fly ash into the batch hopper system, or the facility may be constructed so as to allow gravity discharge to the batching system.

After thorough mixing the resultant conditioned mixture is discharged onto a conveyor belt where it is moved into a stockpile for later rehandling and loading into a dump truck or conveyed directly into a dump truck or transferred via conveyor belt to the working area of the landfill. Regardless of the method of conveyance, the material is placed in the designated area thereby constituting permanent disposal. After initial compaction, the material will support heavy equipment such as trucks or endloaders.

DETAILED DESCRIPTION OF THE INVENTION

The invention is illustrated more or less diagrammatically in the following FIGURES wherein:

FIGS. 1–18 are curves illustrating strength and density of several fly ashes which have been cured for various time periods as a function of liquid content.

The following discussion is based on use of dry fly ash from a coal fired power generating station and (a) water, and (b) liquid waste from an industrial process.

Figure 1:
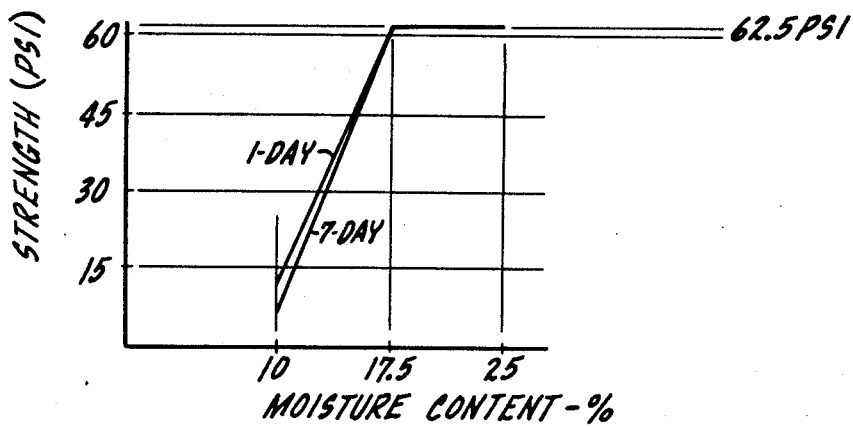
Figure 2:
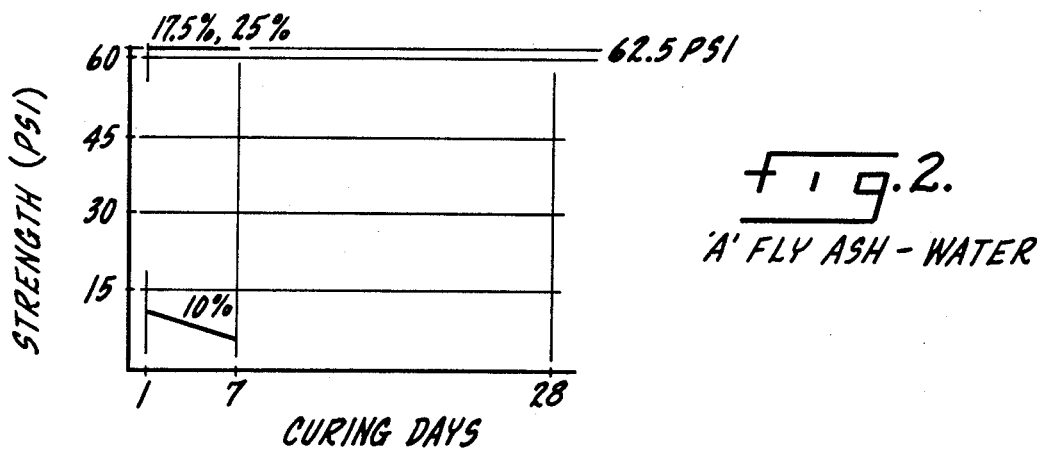
Figure 3:
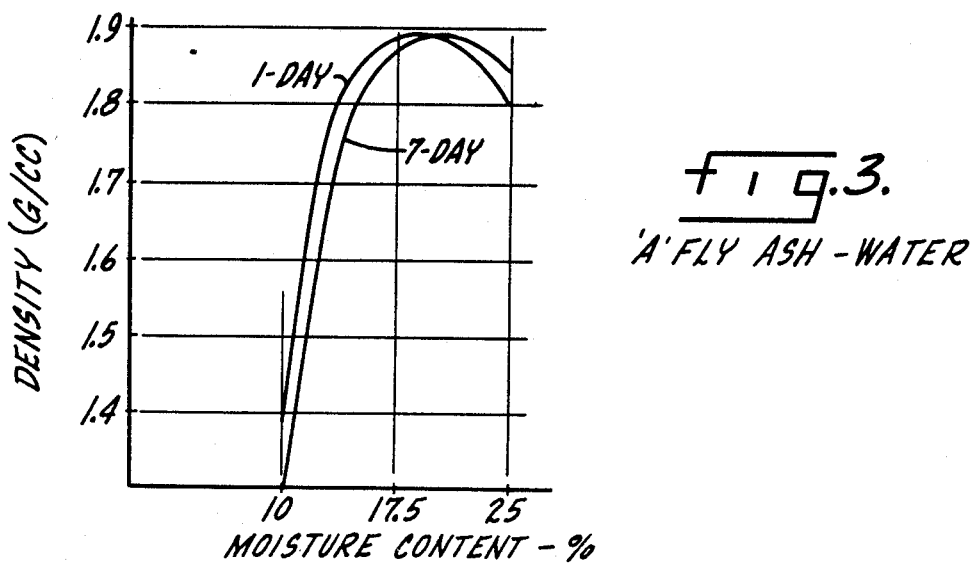
Figure 4:
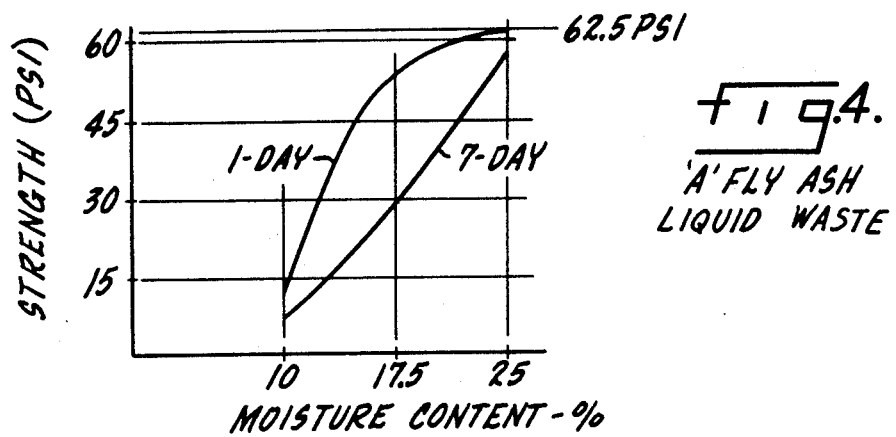
Figure 5:
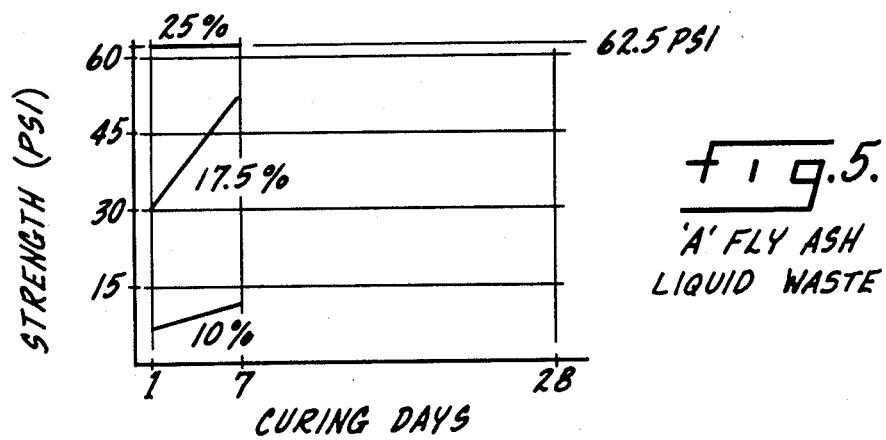
Figure 6:
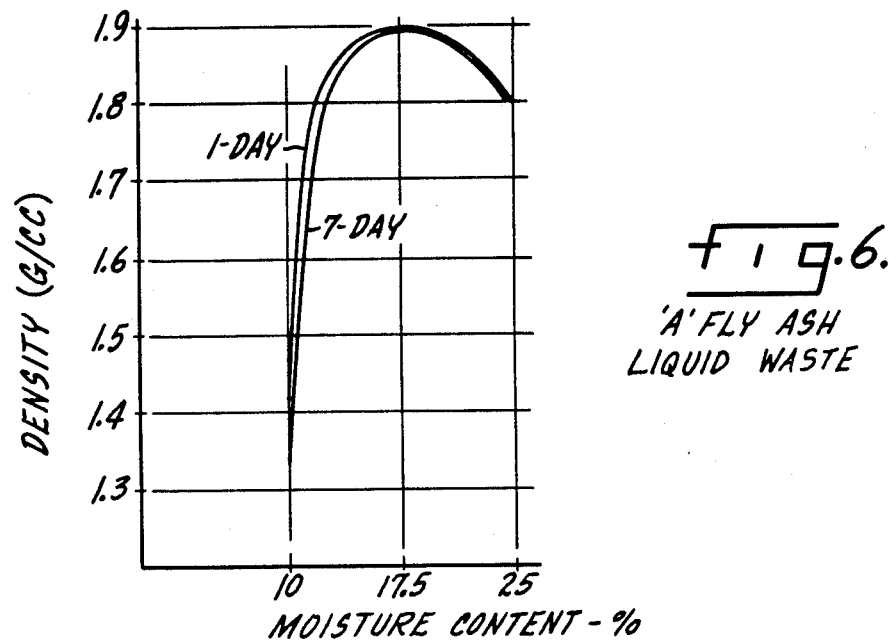
Figure 10:
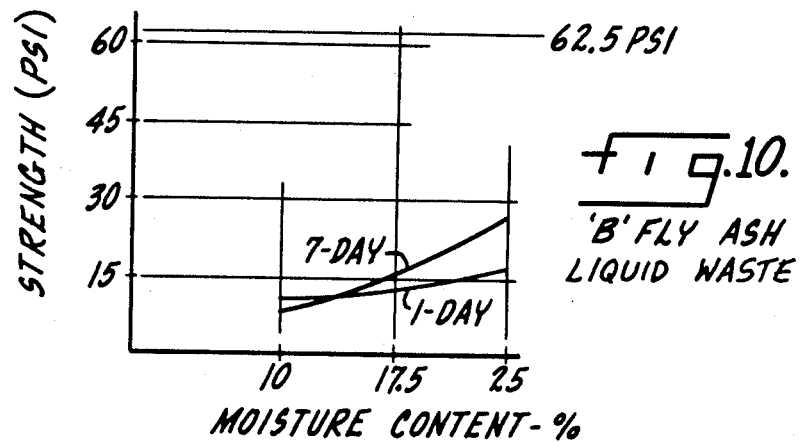
Figure 11:
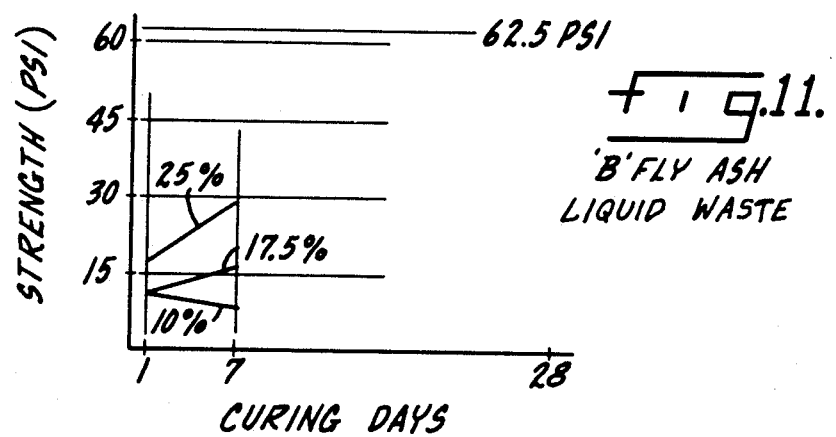
Figure 12:
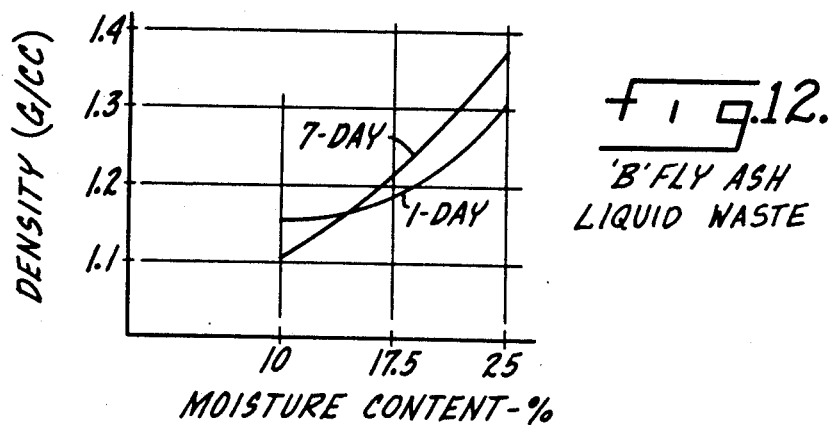
Figure 13:
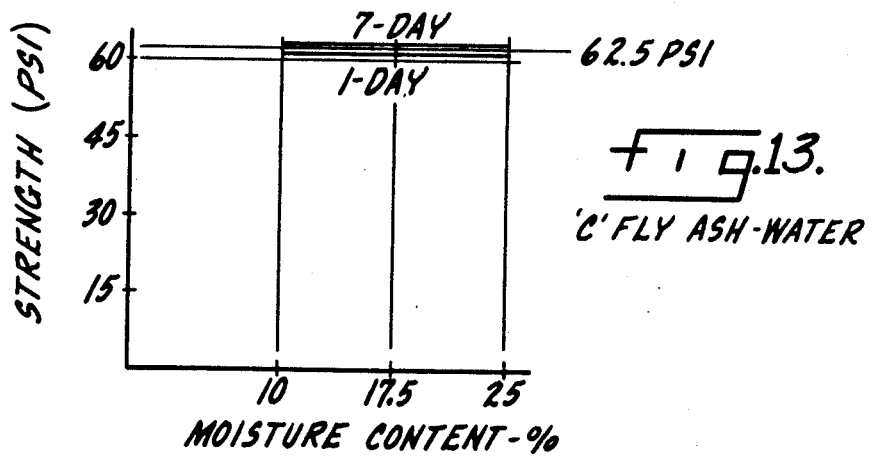
Figure 14:
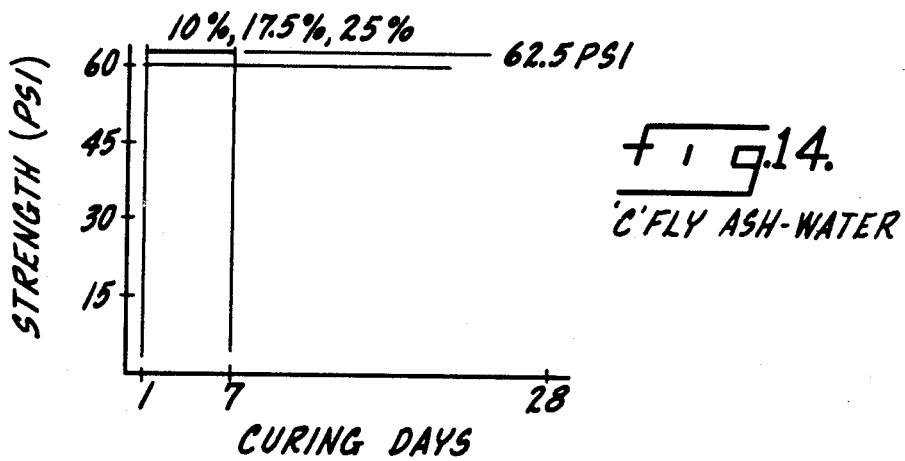
Figure 15:
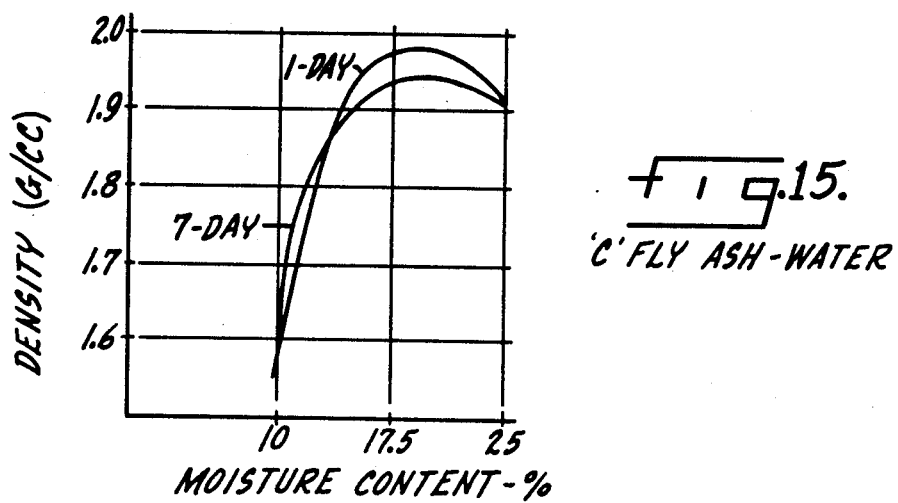
Figure 19:
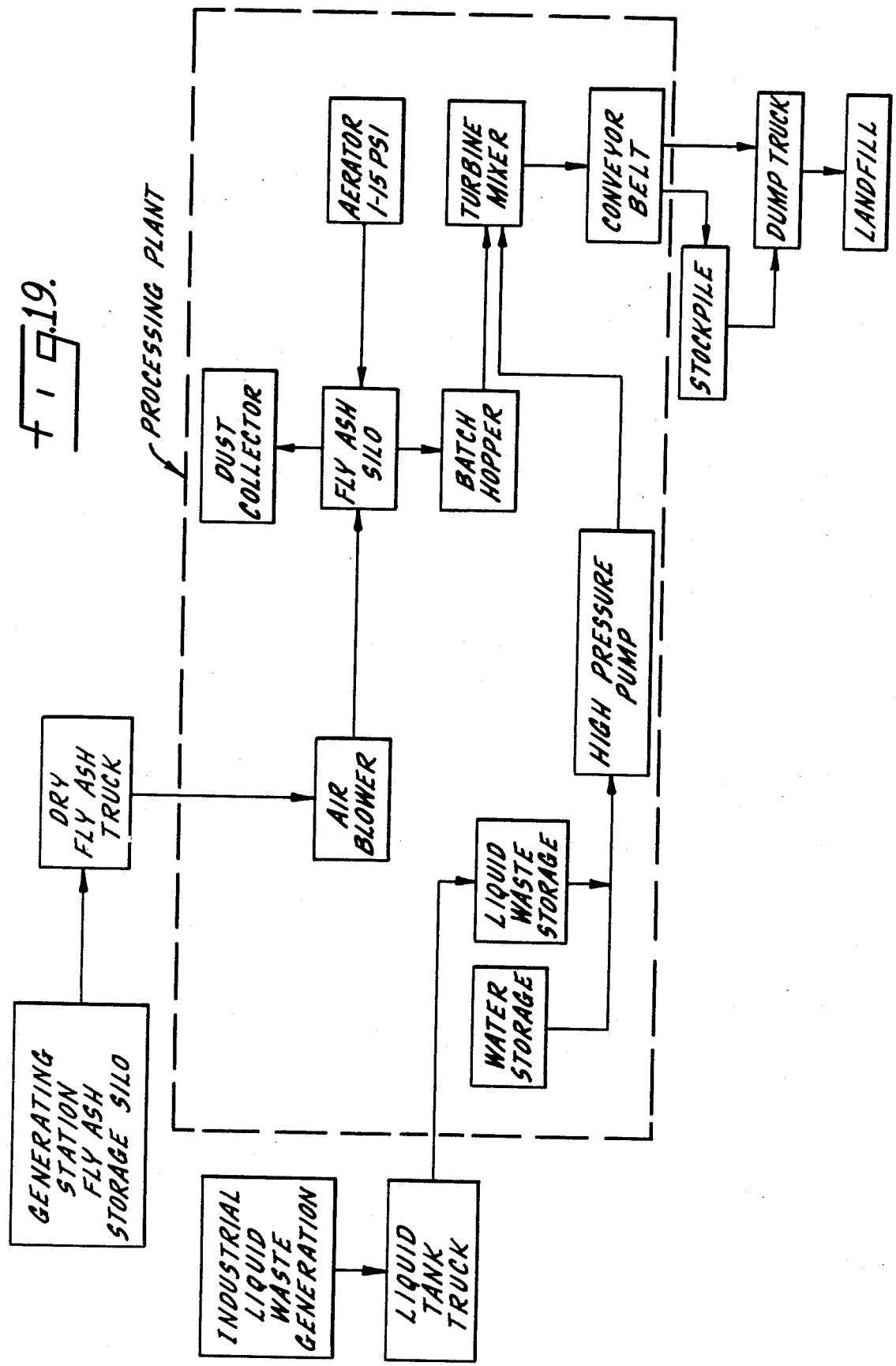
FIG. 19 is a flow diagram illustrating the handling and processing steps in the wasting process commencing at the storage area at the electric power generating station, and terminating at the disposal site cells.

Dry fly ash from the combustion of coal in a power generating station is conveyed by any conventional means from the power generating station boiler system to a silo, which is referred to in FIG. 19 as the Generating Station Fly Ash Storage Silo.

A bulk transport truck, described as a Dry Fly Ash Truck in FIG. 19, is positioned under the silo to receive the dry fly ash. The truck is a pneumatic unloading vehicle having one or more compartments, with each compartment having a hatch on the top and an air circulating device, such as an air pad, an air stone, or a cyclone at the bottom of each compartment, together with a compartment exit pipe. As is well known in the art, the trucks are constructed so that with all hatches and appurtenances closed the truck is air tight.

After positioning beneath the silo at least two hatches on the top of the truck are opened and the loading mechanism, such as a hose or metal pipe, is lowered into one of the hatches. The loading mechanism may, for example consist of, firstly, an interior spout or chute which conveys the dry fly ash from the silo into the truck, and secondly, an exterior spout or chute which is attached to a dust collector or bag house on the top of the storage silo. The function of the exterior chute is to collect fugitive dust from the truck filling operation as the dry fly ash passes downwardly through the interior chute.

After receiving a load of dry fly ash at the Generating Station Fly Ash Storage Silo, the truck hatches are fastened to form an air tight compartment, and the truck transports the fly ash to the Processing Plant at the disposal or landfill site.

At the disposal site, an air hose is attached to the inlet pipe of the bulk trailer. Said trailer may be equipped with a permanent Air Blower to which the air hose may be connected.

The bulk trailer is then air pressurized. In one specific application a three inch air hose powered by an electric motor capable of producing a minimum of 800 cubic feet of air per minute at a pressure of 20 pounds per square inch was found satisfactory when operating with bulk trailers of the 870 cubic foot–1500 cubic foot size. A four inch air discharge hose from the trailer outlet was connected to a pipe which terminates at a dry Fly Ash Silo in the processing station.

Once appropriate pressure is generated within the bulk trailer, for example, about 10 pounds per square inch, this exit pipe valve system is opened and the dry fly ash is thereby transferred from the bulk trailer to the Fly Ash Silo.

It will be understood that in an operating system the tractor will merely position the trailer beneath the processing plant Fly Ash Silo, and will then disconnect, reconnect with an empty bulk trailer which has been earlier emptied and returned to the Generating Station Fly Ash Storage Silo area.

Liquid wastes are conveyed from the generating facility, here referred to as Industrial Liquid Waste Generator, to the landfill Processing Plant via tank type, gravity or pressure unloading Liquid Tank trucks. At the landfill these trucks are directed to a specified unloading area and their contents are discharged to a Liquid Waste Storage Vessel or Pond located within the Processing Plant area.

Dry fly ash in the Processing Plant Fly Ash Silo is then fed from an opening in the bottom of the silo into a batch hopper. Preferrably an Aerator capable of producing a regulated flow of air varying from one psi to fifteen psi is used to keep the dry fly ash flowing and prevent consolidation of the fly ash within the silo.

The dry fly ash moves from the silo via a conduit or pipe, or air slide, into the Batch Hopper. The Batch Hopper is a rectangular box which has an outlet at the bottom of about 10 or 12 inches in diameter. A square to round transition piece connects the box to the outlet. The Batch Hopper and transition piece can hold about one-half to six tons of material or about 15 to 180 cubic feet of fly ash.

The batch hopper can be suspended from scale lever arms to weigh the amount of fly ash in the hopper, or low and high level indicators can be utilized to measure the amount of fly ash received in the Batch Hopper. At a predetermined level or weight, the flow of fly ash into the hopper is stopped automatically. The fly ash is then discharged into a Turbine Mixer. Although turbine mixers vary slightly, most are cylindrical in shape and vary from several cubic feet to several hundred cubic feet in size. Inside the mixer there are numerous arms with paddles on their ends. These arms rotate around the cylinder at a rate of speed of several hundred to a thousand feet per minute.

Water or liquid waste is pumped into the Turbine Mixer in a predetermined quantity to obtain the desired liquid content. Typically a High Pressure Pump is connected to the Water Storage or Liquid Waste Storage, either of which may be a holding tank or pond.

As required the liquid is pumped into the mixer through a liquid meter. When the predetermined liquid amount is added to the fly ash, the meter will signal for the liquid to be recycled into the holding tank or pond until the next fly ash batch needs to be conditioned. The liquid and fly ash can be added to the mixer practically simultaneously in order to shorten the cycle time between batches.

The turbine mixes the liquid and fly ash until a uniform conditioned mixture is formed, usually within a few minutes. The resultant mixture is then removed from the mixer through a sliding or drop gate door from the bottom of the mixer. The mixture falls through a rectangular hopper onto a Conveyor Belt, whose width can be between 24 inches to 36 inches, and can be between 40 to 100 feet or more long. The Conveyor Belt can extend into the air for up to 12–15 feet and discharge the mixture directly into an open Dump Truck for transport to the working area of the Landfill.

The conveyor belt could also be raised 20–50 feet into the air so that the conditioned mixture simply can be stockpiled at the end of the conveyor. Additional belt conveyors can be added to convey the conditioned mixture to the working area of the Landfill if the process facility is located at the disposal site.

If placed into the Stockpile, the mixture is loaded into a dump truck with a front endloader, backhoe, or other suitable piece of equipment. If the Turbine Mixer is elevated to a height of 15–20 feet, it can discharge directly into the Dump Truck.

The Dump Truck can haul the conditioned mixture for many miles; however, in this example it is assumed that the haul is less than one mile to the working Landfill. Once at the Landfill the Dump Truck empties its load and returns for another load. The dumped mixture is spread into layers of 6–12 inches and then compacted. Usually this work can be accomplished with a rubber tired endloader or compactor. The surface may be wetted by a water truck to ensure that no dust escapes from the surface of the compacted fly ash. This mixture will support the trucks and endloader immediately and will continue to gain strength over time as represented by the strength test discussed hereinafter. By this construction method the conditioned mixture can be built into a landfill of virtually any height.

No bleed water or liquid is produced in this process and the mass is stable to the extent that all necessary equipment can operate on the recently placed mixture. Any contaminated rainfall runoff can be pumped or trucked back to the Processing Plant for recycling into the process. When compacted, the conditioned mixture is very dense which conserves future space in the Landfill.

The advantages of the Specific processing equipment herein disclosed are given below.

The process can take place at the source of the fly ash by conveying the fly ash directly from the Electric Power Generating Station Fly Ash Storage Silo to the batch hopper. The mixture can then be transported by open dump truck to the landfill. The process can take place at the liquid waste source. The process would be similar to that described above. Finally, the process can take place at a convenient location away from any generation source or at the landfill.

The process provides maximum controllability ($\pm 1\%$) of desired liquid content of the mixture by measuring both the fly ash and the liquid going into each batch, which assures the quality of the mixture for landfill usage. Also, the system has a high degree of repeatability since all parameters are controlled closely as contrasted to systems currently in use. Modifications in the liquid content can be easily and quickly obtained when necessary because of changes in the fly ash or liquids.

In effect, the process is an economical way of combining two waste streams into a uniform mixture and landfilling the resultant mixture as one product.

It also is an environmentally sound method of disposing of liquid wastes because it assures that the risk of pollution is minimized in that there is a physical and chemical combining of the liquid and fly ash, which thereby reduces the potential for contaminants leaching into the ground water.

The density of the compacted mixture is greater than previous fly ash landfill products, since the liquid content in the processed ash is controlled to achieve maximum density in the landfill. Maximum density of disposed materials is a fundamental objective of any landfill operation.

The process results in control of all elements making up the final mixture, thereby providing a vast improvement in uniformity over other systems which control only one element. Control of the liquid content with existing systems typically is $\pm 20\%$ compared to $\pm 1\%$ for the process described herein.

The amount of liquid required to obtain an acceptable landfill product is substantially less than the sluice method, and which, in the case of water, conserves a natural resource, especially in arid climates.

Conventional, mechanical earth-moving means are used to emplace, spread and compact the soil-like mixture.

Unlike the sluice method, the process creates a conditional product having immediate structural stability. The conditioned product may thus immediately travelled over by dump trucks and other heavy equipment, and grading and compacting may be started after the initial placement.

All rainfall run-off water can be recycled back to the processing plant for use in the processing of fly ash. It can either be pumped back to the plant or loaded into liquid tanker trucks and delivered to the plant. This can further reduce the water requirements of the plant.

Immediate and substantial strengths are obtained with the compacted mixture. Strengths of 2 to 5 tons per square foot (27 psi to 70 psi) can be obtained immediately and much greater strengths over time. This allows for immediate use of the landfill by heavy equipment such as trucks, endloaders, backhoes, and scrapers for site development or whatever other need is required at the landfill.

The permeability of the compacted material ($10^{-5}$ to $10^{-7}$ cm/sec range) is excellent from an environmental standpoint, which further confirms that this mixture is a sound landfill product.

Another unique advantage is that, if the landfilling operation is well planned, it may be possible to break up the compacted mixture at a later date so the fly ash can be recycled as a mineral admixture for concrete.

Specifically, as is now well established, the addition of small quantities of fly ash to Portland Cement Concrete is widely employed for the purpose of reducing the amount of Portland Cement required, which addition improved the concrete's strength, permeability and flow characteristics. The flow characteristics are particularly important when placing structural concrete.

One difficulty experienced by building contractors and suppliers is the substantial variation in the supply of fly ash. Thus, during the cold weather months, particularly in the northern regions of the country, construction activity may be at a greatly reduced level, and the supply of fly ash may be much greater than the demand. This situation frequently is reversed in the warm weather months. Having a uniform reserve of fly ash in a landfill can minimize these supply/demand variations.

Since the disposal cells are composed of compacted fly ash, which can be excavated by earth digging equipment such as front endloaders or backhoes and subsequently pulverized, the excess quantities of fly ash placed into disposal cells during periods of low fly ash demand in the construction industry can, in effect, be stored for later use when the construction industry demand exceeds the supply of fly ash generated by the electric power stations.

While all external landfill site berms probably will be constructed of clay or natural site materials, the traditional need for internal berms has been eliminated, since the recently compacted mixture will have enough structural capacity to immediately support heavy equipment required for landfilling operations.

The invention is further described in the following discussion of specific data.

Table 1 contains the chemical analysis of three fly ash samples, each taken from a power generating station located in the upper midwest.

All three fly ashes are from different coal sources. All were taken from a boiler burning only pulverized coal.

TABLE 1

| ANALYSIS | FLY ASH 'A' | FLY ASH 'B' | FLY ASH 'C' |
|---|---|---|---|
| $SiO_2$ | 55.3 | 55.5 | 59.1 |
| $Al_2O_3$ | 16.2 | 20.4 | 24.4 |
| $TiO_2$ | 1.0 | 1.1 | 1.5 |
| $Fe_2O_3$ | 5.7 | 4.8 | 4.5 |
| CaO | 11.1 | 14.7 | 2.9 |
| MgO | 3.8 | 2.1 | 0.7 |
| $Na_2O$ | 4.2 | 0.2 | 1.4 |
| $K_2O$ | 0.9 | 1.8 | 1.4 |
| $SO_3$ | 2.0 | 0.8 | 0.8 |
| $H_2O$ | 0.3 | 0.1 | 0.2 |
| Unanalyzed Residue | BAL | BAL | BAL |
| $SiO_2 + Al_2O_3 + Fe_2O_3$ | 77.2 | 80.7 | 88.0 |

TABLE 2

STRENGTH AND DENSITY 1-DAY CURE

| | WATER | | | LIQUID WASTE | | |
|---|---|---|---|---|---|---|
| L.C. | STRENGTH | DENSITY | L.C. | STRENGTH | DENSITY |
| 'A' FLY ASH | | | | | | |
| 10.0% | 11 psi | 1.38 gcc | 10.% | 6 psi | 1.44 gcc |
| 17.5% | 62 psi | 1.89 gcc | 17.5% | 29 psi | 1.91 gcc |
| 25.0% | 62 psi | 1.80 gcc | 25.0% | 58 psi | 1.81 gcc |
| 'B' FLY ASH | | | | | | |
| 10.0% | 6 psi | 1.09 gcc | 10.0% | 11 psi | 1.15 gcc |
| 17.5% | 14 psi | 1.24 | 17.5% | 10 psi | 1.17 gcc |
| 25.0% | 15 psi | 1.40 gcc | 25.0% | 17 psi | 1.30 gcc |
| 'C' FLY ASH | | | | | | |
| 10.0% | 62 psi | 1.56 gcc | 10.0% | 62 psi | 1.54 gcc |
| 17.5% | 62 psi | 1.97 gcc | 17.5% | 62 psi | 1.89 gcc |
| 25.0% | 62 psi | 1.92 gcc | 25.0% | 62 psi | 1.87 gcc |

L.C. = Liquid Content, percent
Density = Unit Weight, grams per cubic centimeter

TABLE 3
STRENGTH AND DENSITY
7-DAY CURE

| WATER | | | LIQUID WASTE | | |
|---|---|---|---|---|---|
| L.C. | STRENGTH | DENSITY | L.C. | STRENGTH | DENSITY |
| 'A' FLY ASH | | | | | |
| 10.0% | 6 psi | 1.30 gcc | 10.0% | 10 psi | 1.33 gcc |
| 17.5% | 62 psi | 1.86 gcc | 17.5% | 52 psi | 1.89 gcc |
| 25.0% | 62 psi | 1.86 gcc | 25.0% | 62 psi | 1.81 gcc |
| 'B' FLY ASH | | | | | |
| 10.0% | psi | 1.18 gcc | 10.0% | 8 psi | 1.10 gcc |
| 17.5% | 19 psi | 1.24 gcc | 17.5% | 15 psi | 1.22 gcc |
| 25.0% | 24 psi | 1.36 gcc | 25.0% | 27 psi | 1.37 gcc |
| 'C' FLY ASH | | | | | |
| 10.0% | 62 psi | 1.60 gcc | 10.0% | 62 psi | 1.47 gcc |
| 17.5% | 62 psi | 1.93 gcc | 17.5 | 62 psi | 1.88 gcc |
| 25.0% | 62 psi | 1.91 gcc | 25.0% | 62 psi | 1.90 gcc |

L.M. = Liquid Content, percent
Density = Unit Weight, grams per cubic centimeter The testing procedure for the three fly ash samples was as follows.

TESTING PROCEDURE

The testing procedure was directed toward analyzing strength and density as a function of different liquid contents. The liquids utilized in the study were water and a liquid waste product. Three liquid contents were used and tests for strength were taken at 1, 7, and 28 days. The liquid contents analyzed were 10.0%, 17.5% and 25.0%. The liquid content is a ratio, expressed as a percent, based on weight of liquid divided by the dry weight of fly ash.

Each of the three fly ashes was mixed with the three liquid contents, and three specimens were made for each liquid content. Therefore for fly ash 'A' at 10.0% liquid content, three specimens were mixed using water as the liquid and three specimens were mixed using a liquid waste.

MIXING

For the conditioned mixture to develop its maximum possible strength, the two materials must be thoroughly mixed. It should be understood that the intensity or degree of mixing obtained in the plant mixing equipment is substantially greater than with laboratory mixing equipment. It is important that the materials be thoroughly mixed to achieve a uniform product.

The mixing procedure conducted in the laboratory consisted of adding the liquid and thoroughly mixing. This was accomplished by a laboratory mixer. After mixing, the mixture is ready for molding.

MOLDING AND COMPACTION

Molding and compaction was conducted in accordance with the procedure stated in ASTM designation C-595. The molds used were cylindrical in shape having an inside diameter of 2±⅛ inch and a height of 4±⅛ inch.

Compaction was done according to the above ASTM designation. Each mold was filled in four layers of equal depth. Each layer was tamped by the standard metal rod 25 times. The metal rod is one inch in diameter equal to a tamping surface area of 0.75 sq. in. The samples were tamped with a uniform force to ensure a homogeneous specimen.

CURING

The curing of the specimens were conducted after 1, 7, and 28 days. The specimens were stored at 72° F. ±3° F. until time for testing.

UNCONFINED COMPRESSION TESTS

After proper curing the specimens were tested for strength using a hand held penetrometer which has been correlated with laboratory strength tests. The hand held penetrometer was used to penetrate the sides of the specimen and a reading taken. After the strength test the specimen density was determined.

RESULTS The initial determination was for strength. However, the upper limit on the hand-held penetrometer is 4.5 tsf or 62 psi. The FIGURES labeled strength vs. liquid content indicate that the upper limit for the penetrometer is exceeded except for 'B' fly ash.

This fly ash has a substantially different chemical composition and its optimum liquid content was not in the range of 10-25%.

The 'B' fly ash is not as dense a material as the 'A' and 'C' fly ashes. Therefore more liquid is needed to form a uniform conditioned mixture using either water liquid waste.

The graphs of FIGS. 1-6 and 13-18 indicate the upper strength measuring limit of the penetrometer was reached for both the water and liquid wastes.

Strength tests for 'A' and 'C' fly ash do not indicate the optimum liquid content for a uniformly conditioned mixture. The 'B' fly ash strength increases with liquid content and time (curing days).

Next, densities were analyzed to find the optimum contents. The 'B' fly ash optimum liquid content was not found by these tests; however, the optimum liquid contents were found for 'A' and 'C' fly ashes.

Utilizing 'A' fly ash with water or a liquid waste for a uniform processed mixture, a liquid content of about 18% is optimum. The average density for 1 and 7 days results is 1.9 gcc or 118 pcf for either water or the liquid waste.

The 'C' fly ash optimum content is about 20% for both water and the liquid waste. The maximum average density obtained for the water is 1.96 gcc or 122 pcf. Using the liquid waste an average density of 1.9 gcc or 118 pcf was achieved.

The optimum liquid content for the 'B' fly ash was not found. It is believed that in order for this material to be conditioned under optimal conditions about 30.0% liquid should be used for both water and liquid waste treatment.

Regarding specifications for proper compaction of a conditioned fly ash for a landfill, a certain percent of maximum dry density should be obtained. Whether this is achieved is clearly related to the moisture content.

Liquid content is controlled in this process to produce a uniform mixture. With the proper liquid content, 85% of maximum dry density can be readily achieved. Densities achieved in the laboratory of 118–122 pcf are comparable to various types of soils. Clayey sands in Mississippi typically have densities of about 117 pcf; glacial clay fills in Illinois typically have densities of about 120 pcf.

What the laboratory studies indicate is that high densities can be achieved in the landfill at the optimum liquid contents. To achieve these high densities in the field, controlled rolling of a rubber tired vehicle (whether it be the grade, dump truck, or endloader) is generally sufficient.

Although a preferred embodiment of the invention has been illustrated and described, it will be apparent to those skilled in the art that variations and modifications may be made within the scope of the inventive concept herein disclosed. Accordingly, it is intended that the scope of the invention be limited only by the scope of the hereafter appended claims when interpreted in light of the pertinent prior art, and not by the scope of the specific, exemplary preceding description.

We claim:

1. In a method of waste disposal the steps of
storing fly ash after its formation in a dry condition in a first storage location;
conveying the fly ash in a dry condition from said first storage location in a closed chamber transport vessel, such that the fly ash is precluded from contacting the ambient atmosphere during transit, to a second, processing location;
storing the fly ash in a closed vessel at said second location, such that the fly ash is precluded from contacting the ambient atmosphere during storage;
forming a conditioned soil-like product consisting of an intimate mixture of fly ash and a liquid at said second location,
said conditioned product forming step comprising a period of mixing exceeding one minute,
said conditioned, soil-like product having a liquid content of from no less than about 5% to no more than about 20% by weight,
depositing the conditioned, soil-like product into a disposal site, which is exposed to ambient environmental conditions, by conventional, mechanical earth-moving means,
spreading and compacting the conditioned, soil-like product by conventional earth-moving means, and
hardening the conditioned, soil-like compacted product while said product is exposed to ambient environmental conditions.

2. The method of claim 1 further characterized in that the conditioned product has an unconfined bearing pressure of at least one ton per square foot in an as made condition.

3. The method of claim 1 further characterized in that the conditioned product has a permeability of at least $10^{-5}$ following curing for seven days under standard conditions of use.

4. The method of claim 1 further characterized in that the liquid is water.

5. The method of claim 1 further characterized in that the liquid is an industrial liquid waste.

* * * * *